United States Patent
Islam et al.

(10) Patent No.: US 12,298,204 B2
(45) Date of Patent: May 13, 2025

(54) EYEWEAR ENDURANCE TESTER

(71) Applicant: GOOGLE LLC, Mountain View, CA (US)

(72) Inventors: Rashed Adnan Islam, Saratoga, CA (US); Maxim O. Sivov, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 249 days.

(21) Appl. No.: 17/937,161

(22) Filed: Sep. 30, 2022

(65) Prior Publication Data
US 2023/0117835 A1    Apr. 20, 2023

Related U.S. Application Data

(60) Provisional application No. 63/262,785, filed on Oct. 20, 2021.

(51) Int. Cl.
*G01M 5/00* (2006.01)
*G01M 11/08* (2006.01)

(52) U.S. Cl.
CPC ............ *G01M 5/005* (2013.01); *G01M 11/08* (2013.01)

(58) Field of Classification Search
CPC ...... G01M 5/005; G01M 11/08; G01M 11/00; G01M 7/027
See application file for complete search history.

(56) References Cited

U.S. PATENT DOCUMENTS

| | | | | |
|---|---|---|---|---|
| 8,746,088 B2 * | 6/2014 | Huang | ...................... | G01N 3/32 |
| | | | | 73/865.3 |
| 2004/0200790 A1 | 10/2004 | Zoueki | | |
| 2024/0126105 A1 * | 4/2024 | Michels | ................... | H04N 9/31 |

FOREIGN PATENT DOCUMENTS

| | | | | |
|---|---|---|---|---|
| CN | 201707199 U | * | 1/2011 | |
| CN | 106066288 A | * | 11/2016 | ............... G01N 3/32 |
| CN | 207763948 U | * | 8/2018 | |
| CN | 107271123 B | | 4/2019 | |
| CN | 209311821 U | * | 8/2019 | |
| CN | 213714707 U | | 7/2021 | |
| CN | 220007549 U | * | 11/2023 | |
| DE | 3518215 | * | 10/1985 | |
| JP | 3102827 U | * | 7/2004 | |
| JP | 2018009942 A | | 1/2018 | |

* cited by examiner

*Primary Examiner* — Octavia Hollington
(74) *Attorney, Agent, or Firm* — Brake Hughes Bellermann LLP

(57) ABSTRACT

A pair of glasses includes a frame and a pair of temples. The frame can hold lenses in front of a person's eyes while the pair of temples can rest over the person's ears. A tester for endurance testing of the pair of glasses, includes: a frame holder disposed vertically on a horizontal base plate, the frame holder configured to secure the pair of glasses in a test position with the pair of temples extending from the frame holder horizontally in a space above the base plate, the pair of temples having an inter-temple separation distance; and a pair of motorized pushers configured to contact and displace each of the pair of temples simultaneously toward or away from the other temple in the pair of temples.

21 Claims, 13 Drawing Sheets

```
┌─────────────────────────────────────────────────────────────────────┐
│ Fastening a pair of glasses to a vertical stand disposed on a       │
│ horizontal base plate with a pair of temples of the pair of glasses │
│ extending horizontally from the vertical stand at a height in a     │
│ space above the base plate                                          │
│ 810                                                                 │
└─────────────────────────────────────────────────────────────────────┘
                                    │
┌─────────────────────────────────────────────────────────────────────┐
│ Using a pair of motorized pushers to repeatedly displace (stretch)  │
│ each of the pair of temples simultaneously toward or away from the  │
│ other temple in the pair                                            │
│ 820                                                                 │
└─────────────────────────────────────────────────────────────────────┘
                                    │
┌─────────────────────────────────────────────────────────────────────┐
│ After a pre-determined number of displacement (stretching) cycles   │
│ using the pair of motorized pushers to repeatedly displace (stretch)│
│ each of the pair of temples, inspecting the pair of glasses         │
│ including the pair of temples for structural or functional          │
│ degradation                                                         │
│ 830                                                                 │
└─────────────────────────────────────────────────────────────────────┘
```

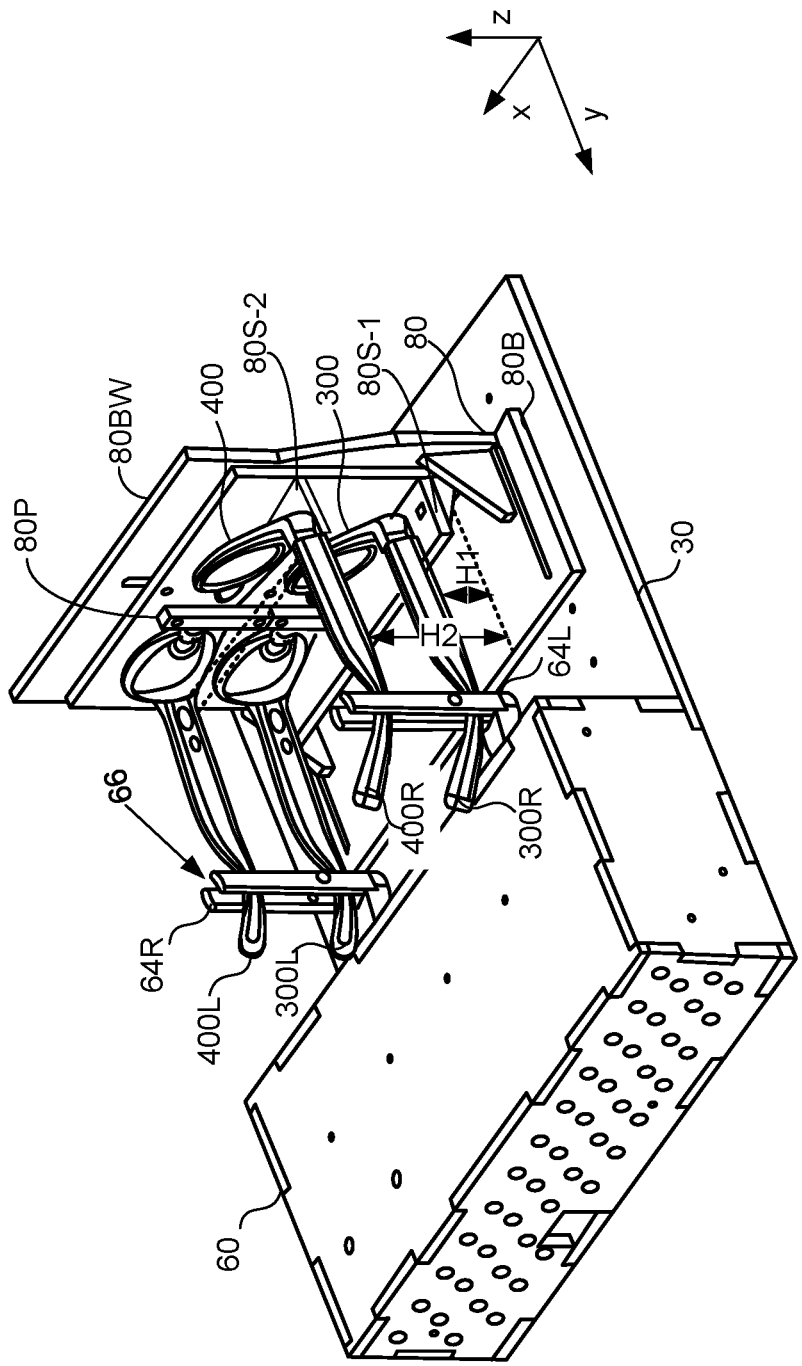

EYEWEAR ENDURANCE TESTER

RELATED APPLICATION

This application claims priority to, and the benefit of, U.S. Provisional Patent Application No. 63/262,785, filed Oct. 20, 2021, which is incorporated by reference in its entirety herein.

FIELD

This disclosure relates to endurance testing of eyewear.

BACKGROUND

Eyewear (i.e., a pair of glasses, also known as glasses, eyeglasses or spectacles) can be vision aids, consisting of glass or hard plastic lenses mounted in a frame that holds them in front of a person's eyes, typically utilizing a nose bridge over the nose, and legs (known as temples or temple pieces) that rest over the ears. In general, eyewear may include prescription glasses, reading spectacles, fashion eyewear (tinted and clear), sunglasses, ski, and safety goggles, and more. For example, the eyewear can be smart glasses that add information on an in-lens display alongside what the wearer sees through the glasses.

Consideration is now being given to systems and methods of endurance testing of eyewear for quality assurance, for example, of the mechanical strength and durability of the eyewear.

SUMMARY

A pair of glasses includes a frame and a pair of temples. The frame can hold lenses in front of a person's eyes while the pair of temples can rest over the person's ears.

In a general aspect, a tester for endurance testing of the pair of glasses, includes: a frame holder disposed vertically on a horizontal base plate, the frame holder configured to secure the pair of glasses in a test position with the pair of temples extending from the frame holder horizontally in a space above the base plate, the pair of temples having an inter-temple separation distance; and a pair of motorized pushers configured to contact and displace each of the pair of temples simultaneously toward or away from the other temple in the pair of temples.

BRIEF DESCRIPTION OF THE DRAWINGS

Example embodiments will become more fully understood from the detailed description herein and the accompanying drawings, wherein like elements are represented by like reference numerals, which are given by way of illustration only and thus are not limiting of the example embodiments.

FIG. 8 illustrates an example method for endurance testing of eyewear.

FIGS. 9A-9C illustrate views of a scaled-up version of the motorized endurance tester of FIGS. 2A and 2B configured to test two glasses simultaneously.

It should be noted that these FIGS. are intended to illustrate the general characteristics of methods, structures, and/or materials utilized in certain example embodiments and to supplement the written description provided below. These drawings are, however, not to scale and may not precisely reflect the precise structural or performance characteristics of any given embodiment and should not be interpreted as defining or limiting the range of values or properties encompassed by example embodiments. For example, the relative thicknesses and positioning of components of the described eyeglasses may be reduced or exaggerated for clarity. The use of similar or identical reference numbers in the various drawings is intended to indicate the presence of a similar or identical element or feature.

DETAILED DESCRIPTION OF THE EMBODIMENTS

Figure 1:
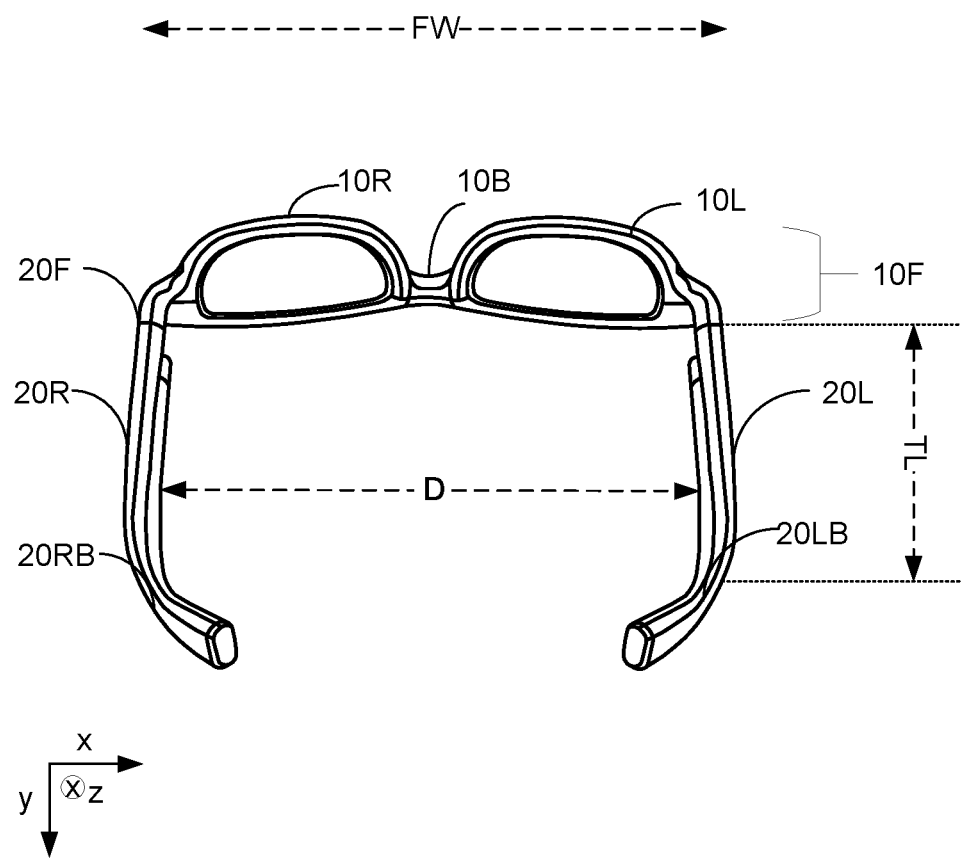
FIG. 1 illustrates an example eyewear.

FIG. 1 illustrates an example eyewear (e.g., glasses 100), which may be subject to endurance testing by the systems and methods of the present disclosure.

Glasses 100 may include two half-frames 10R and 10L to hold a pair of see-through lenses in front of a person's eyes. The two half-frames may be joined using wires, bands, and/or other joining means to form a spectacle frame 10F (hereinafter "frame", or "eyeglasses frame"). The joining means can include a nose bridge portion (e.g., nose bridge 10B). Spectacle frame 10F may have a front width FW (e.g., in an x direction) that may be selected to match, for example, an ear-to-ear face width of the person using the eyewear.

Further, glasses 100 may include temples (arms) (e.g., right temple 20R and left temple 20L) that are attached to respective ends of the two half-frames 10R and 10L. The temples may be attached to the ends of the two half-frames 10R and 10L by joining means including, for example, hinges (e.g., hinge 20F), adhesives, or other elastic or solid material. Right temple 20R and left temple 20L may extend generally perpendicular to the two half-frames 10R and 10L, for example, in a y direction, and have an inter-temple separation or distance D, for example, in the x direction. Each of the temples (e.g., right temple 20R and left temple 20L) may be generally straight pieces with a straight length, for example, of about TL extending from the front portion of the frame (i.e., frame 10F) in the y direction. Length TL may be sufficient for the temples to reach over resting positions on the person's ears when frame 10F is positioned in front of the person's eyes. In some implementations, each of the temples (e.g., right temple 20R and left temple 20L) may include respective bent portions (e.g., right temple bend 20RB and left temple bend 20LB) that can be curved behind the person's ears, for example, to hold the glasses in place (e.g., to prevent the glasses from sliding forward when the person's head is tilted downward).

Glasses 100 can consist of glass or hard plastic lenses mounted in the two half-frames 10R and 10L that holds them in front of the person's eyes utilizing for example, nose bridge 10B over the nose, and the temples (e.g., right temple 20R and left temple 20L) which rest over the ears of the person. The resting positions of the temple pieces over the ears of the person can be at vertical heights above or below the heights of the person's eye pupils (in their natural head position and gaze). The resting positions of the temple pieces over the ears of the person can define the tilt and width of the glasses and determine both the display and comfort. Glasses 100 may be fitted to the person' face or head anatomically in a fitting session (e.g., by an optometrist). The fitting may involve determining an optimal position of the frame for what the wearer sees through the glasses. For example, the left and right temples may, for example, be separated to match the width of the person's head for a tight yet comfortable holding grip on the sides of the person's head. The left and right temples may also be bent over the ears to hold the glasses in place (e.g., to prevent the glasses from sliding forward, for example, when the person's head is tilted downward).

In some example implementations, a virtual display (not shown) may be overlaid on, or embedded in, at least one of the pair of see-through lenses held in the two half-frames 10R and 10L. The temple pieces attached to eyeglasses frame may include electronics and other components (e.g., control circuits, batteries, projectors, or other circuitry) (not shown), for example, to prepare and send data (e.g., captions, images) for display on the virtual display.

In use, the person may repeatedly take off his or her glasses and re-wear the glasses at different times of the day. In some instances, the person may place the glasses (e.g., sunglasses, or specific near- or far-vision eyewear) on top of their head when not using the glasses for ease of carrying the glasses around. The actions of removal and re-wearing of the glasses may involve displacing (e.g., stretching or pushing) the temple pieces outward away from, or toward, each other (e.g., in the x direction, FIG. 1). These repeated actions (depending on the elasticity and durability of the materials that the glasses frame is made of) can degrade the structure or the dimensional integrity of the glasses. Glasses in which one or more of the temples (e.g., right temple 20R and left temple 20L) include electronics, the electronics may be damaged or degraded.

The degradation of the structure or dimensional integrity (even if not a catastrophic structural failure) of the glasses can lead to misfit (e.g., loosening) of the glasses (e.g., by permanently increasing the inter-temple separation or distance D). Corrective actions to address the degradation may include, for example, expensive replacement, or require, refitting of the glasses on the person by an optometrist.

For ensuring a good product lifetime, it is desirable to conduct endurance testing of the glasses before the glasses are marketed or sold to customers. The results of the endurance testing may be used to refine, change, and/or update the design and/or specifications of the glasses that are marketed or sold to the customers. In an example implementations, the results of the endurance testing may include measurements of the inter-component dimensions of the glasses and or material properties (e.g., stiffness) of the components before and after endurance testing. Data on the changes in the inter-component dimensions of the glasses and or material properties (e.g., stiffness) of the components may be used refine, change, and/or update the design and/or specifications of the glasses. For example, the endurance testing may show that the stiffness of hinges in the glasses degrades to unacceptable levels over the course of the endurance testing. The type, materials, or dimensions of such hinges may be respecified for improved versions of the glasses. In example implementations, the endurance testing results may lead to changing the stiffness of both the hinges and the frame. In example implementations, changes may be made to the architecture of the hinges (e.g., spring loaded or non-spring-loaded hinge, etc.).

Systems and methods for endurance testing of eyewear are described herein. The disclosed systems and method may simulate, in a laboratory environment, the stretching of eyewear (e.g., repeated widening of inter-temple distances D) that can occur when a person repeatedly puts on and takes off the eyewear in actual use. Such endurance testing can ensure that the eyewear is comfortable to wear and perfectly fits the person's face from a first day to the end of the product life.

FIGS. 2A, 2B, 3, 4A, and 4B illustrate an example motorized endurance tester 200 for testing eyewear (e.g., glasses 100) under conditions similar to the stresses (e.g., repeated widening of inter-temple distances D) on the frame and temples of the eyewear in actual use by a person. Motorized endurance tester 200 may, for example, be configured to repeatedly displace the temples outward away from, and toward, each other through a range of inter-temple distances D.

Figure 2A:
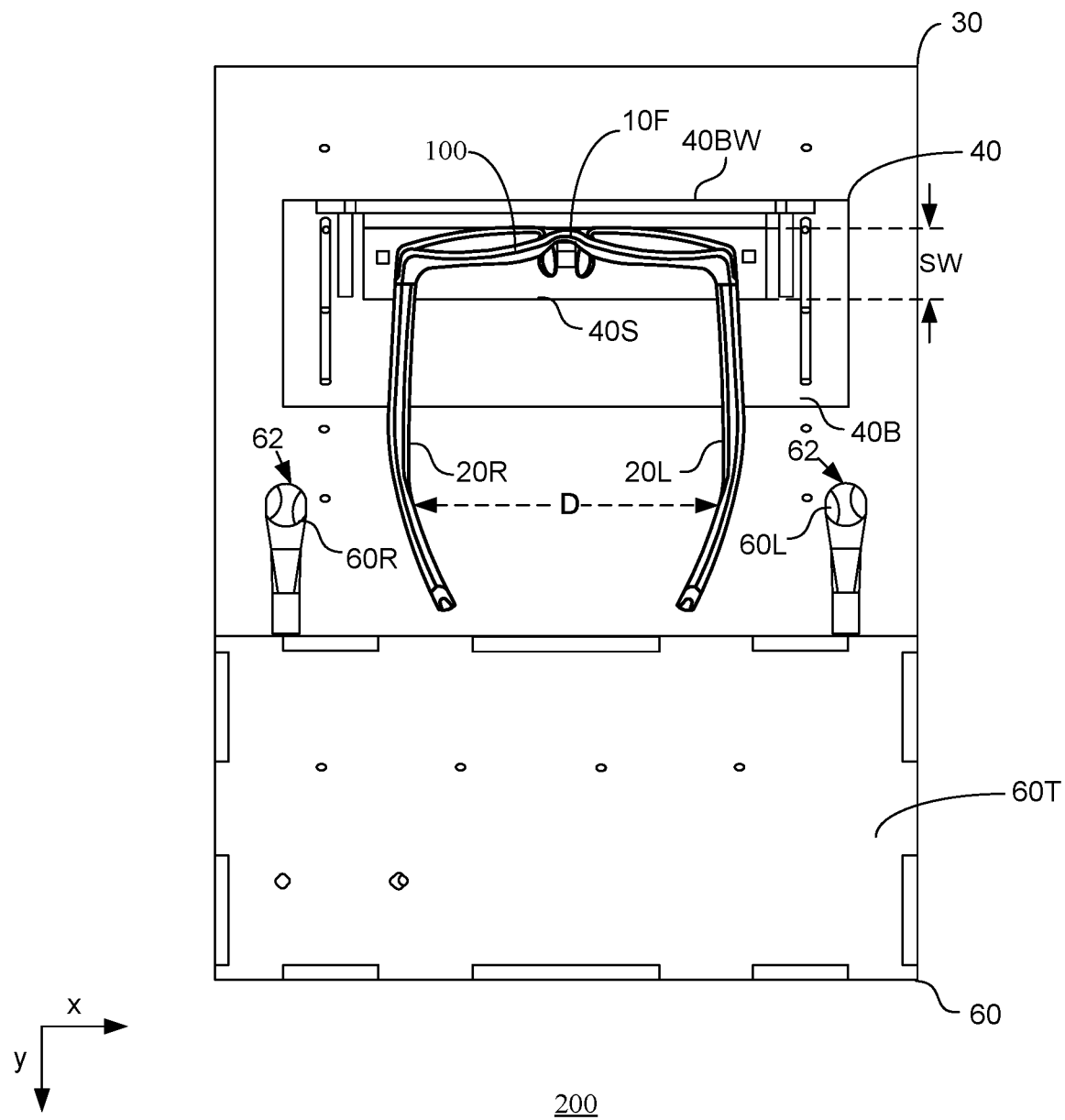
FIG. 2A illustrates a top view of a motorized endurance tester of glasses.
Figure 2B:
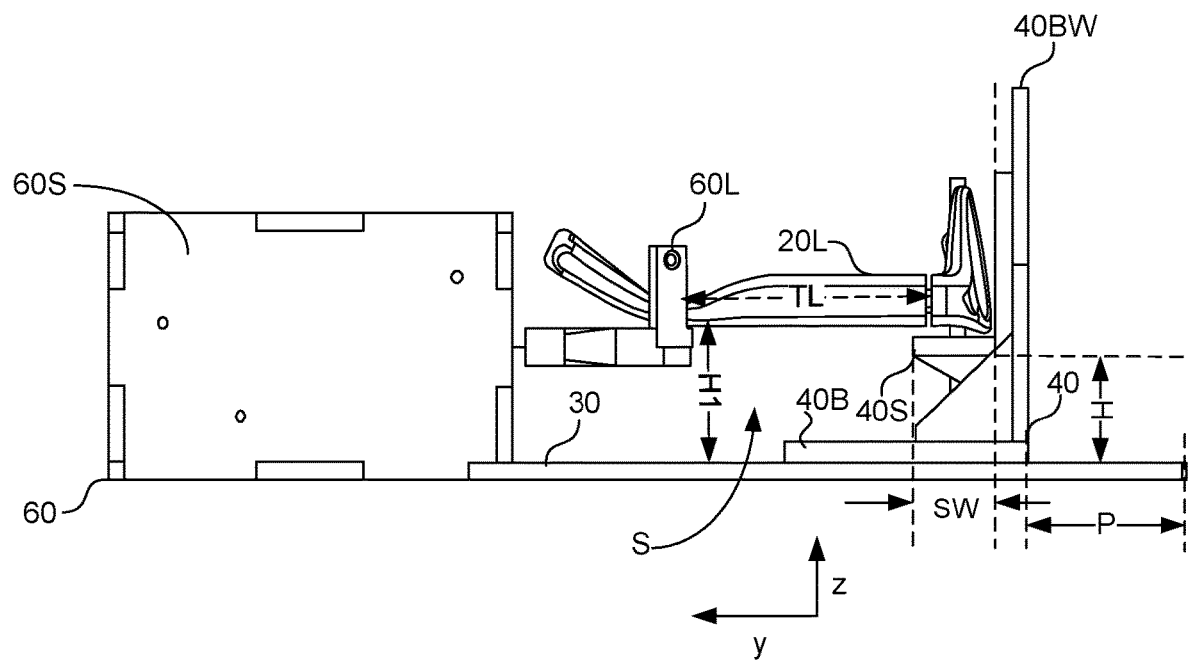
FIG. 2B illustrates a side view of the motorized endurance tester of FIG. 2A.

FIG. 2A shows a top view of the example motorized endurance tester 200. FIG. 2B shows a side view of the example motorized endurance tester 200.

Endurance tester 200 may include a motor box 60 (formed, e.g., by sides 60S, 60F, 60B and 60T (FIGS. 2A, 2B and 3)) fastened on a base plate 30 that extends, for example, in the x-y plane. Motor box 60 may include a stepper motor, and gear mechanisms, for driving (moving) other components of endurance tester 200 as will be discussed later below (e.g., with reference to FIG. 3).

Endurance tester 200 may further include an adjustable frame holder (e.g., stand 40) disposed on a horizontal base plate 30. Stand 40 may be configured secure the test eyewear (e.g., glasses 100) in a test position in the tester. Stand 40 may include a stand base 40B, a backwall 40BW extending vertically from stand base 40B, and a shelf (e.g., shelf 40S) extending horizontally (e.g., in the y direction) from backwall 40BW. As shown in FIG. 2A, in a test position, a front portion (e.g., frame 10F) of glasses 100 may be placed on, and supported by, shelf 40S, while right temple 20R and left temple 20L may extend beyond shelf 40S (e.g., in the y direction in a space S above base plate 30, FIG. 2B). Right temple 20R and left temple 20L may, for example, extend (e.g., in the y direction) beyond shelf 40S at a height H1 above base plate 30 (H1>H, FIG. 2B).

In example implementations, as shown in FIG. 2B, shelf 40S may have a width SW. Further, shelf 40S may have a height H (above horizontal base plate 30), and a position distance P of stand base 40B on horizontal base plate 30 (e.g., from an edge of the horizontal base plate). The shelf height H and the position distance P of stand base 40B may be adjustable, for example, to accommodate different types of geometries or sizes of the eyewear that may be tested in endurance tester 200.

Motorized endurance tester 200 may further include moveable grippers or pushers (e.g., pusher 60R and pusher 60L) that extend from motor box 60 and can be adjusted (e.g., extended or retracted in the x, y, or z directions) to contact and push the temples (e.g., right temple 20R and left temple 20L, respectively) sideways in the test position. The positions of pusher 60R and pusher 60L may be adjustable, for example, to align with (or grip) the temples (e.g., right temple 20R and left temple 20L, respectively) at any point along the lengths (e.g., length TL) of the temples (including the tips or bent portions of the temples).

In some example implementations, the moveable grippers or pushers (e.g., pusher 60R and pusher 60L) may include slots 62 that may be used to hold or grip the temples (e.g., right temple 20R and left temple 20L, respectively) at any point along the lengths (e.g., length TL) of the temples (including the tips or bent portions of the temples).

For endurance testing, pusher 60R and pusher 60L may repeatedly displace (i.e., push or pull) the temples (e.g., in the x direction) in cycles through different inter-temple distances D. For this purpose, pusher 60R and pusher 60L may be coupled to, and driven by a motor via a gear mechanism in motor box 60 to move in opposite directions along the x direction.

Figure 3:
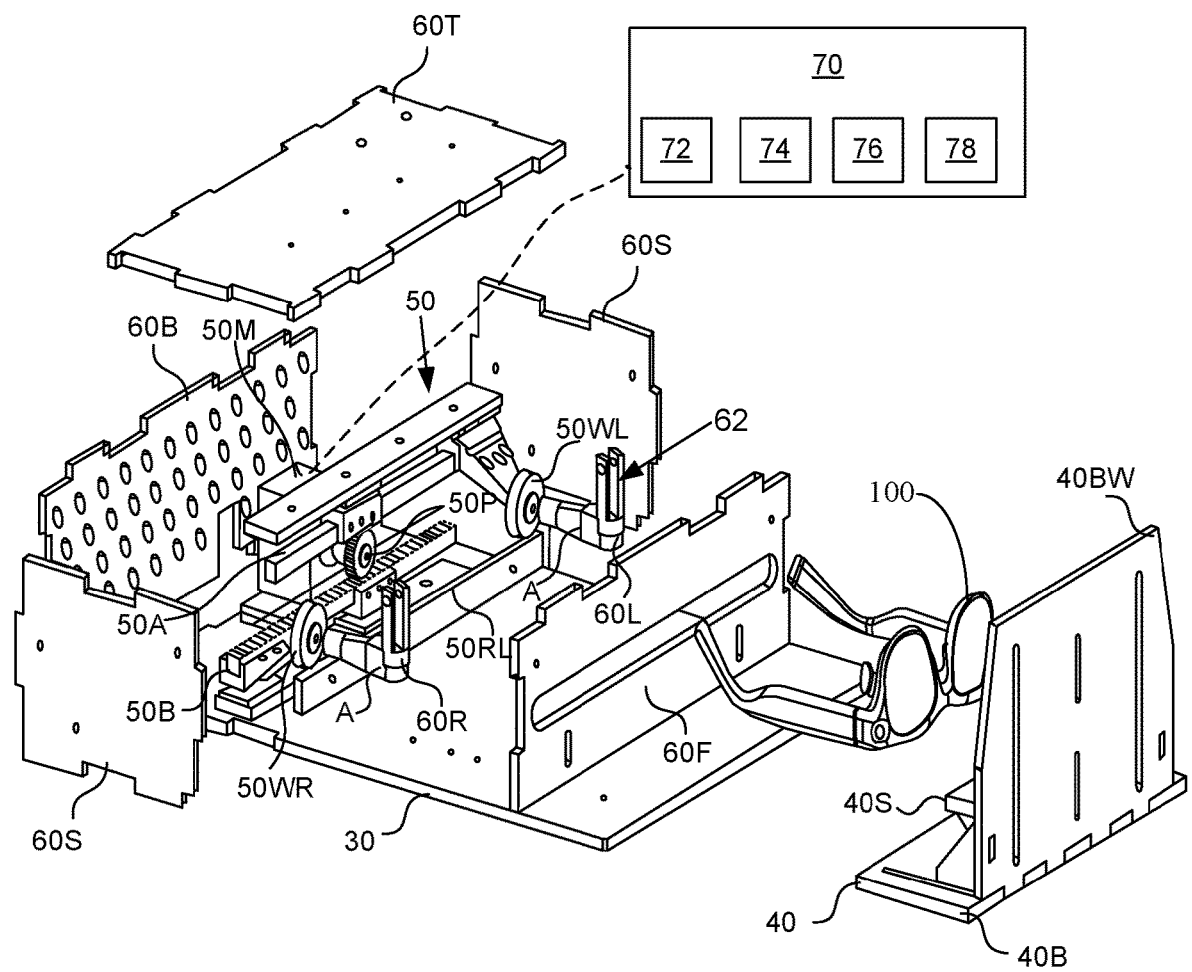
FIG. 3 illustrates an exploded perspective view of the motorized endurance tester of FIGS. 2A and 2B.

FIG. 3 shows an exploded view of motorized endurance tester 200, in which motor box 60 includes a motor (e.g., motor 50M, a stepper motor) coupled to pusher 60R and pusher 60L by a gear mechanism 50. In example implementations, gear mechanism 50 may include a dual track and pinion arrangement coupling the motor to pusher 60R and pusher 60L. For example, as shown in FIG. 3, motor 50M may rotate pinion 50P coupled to two linear tracks (e.g., track 50A and track 50B). Each of the tracks may be attached to a respective wheel (e.g., wheel 50WL and wheel 50WR) that runs on a common linear rail (e.g., rail 50RL, an aluminum rail). A respective pusher (e.g., pusher 60R and pusher 60L) may be attached to axle A of the respective wheel (e.g., wheel 50WL and wheel 50WR). The dual track and pinion arrangement may be configured so that the dual tracks (i.e., track 50A and track 50B) translate in opposite directions when pinion 50P rotates (clockwise or counterclockwise), and move the attached wheels (e.g., wheel 50WL and wheel 50WR) and the attached pushers (e.g., pusher 60R and pusher 60L) in opposite directions.

The movement of the pushers (e.g., pusher 60R and pusher 60L) in opposite directions may be used to repeatedly displace the temples of the glasses under test through different inter-temple distances D.

Figure 4A:
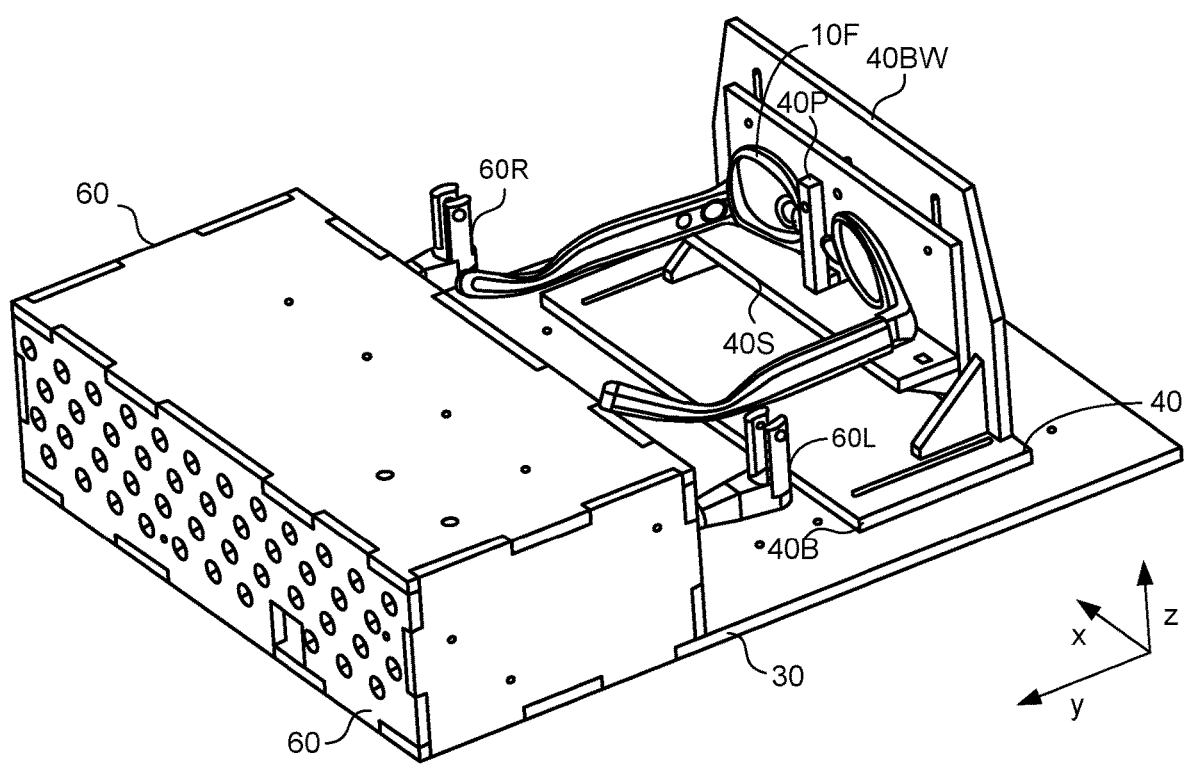
FIGS. 4A and 4B illustrate additional perspective views of the motorized endurance tester of FIGS. 2A and 2B.
Figure 4B:
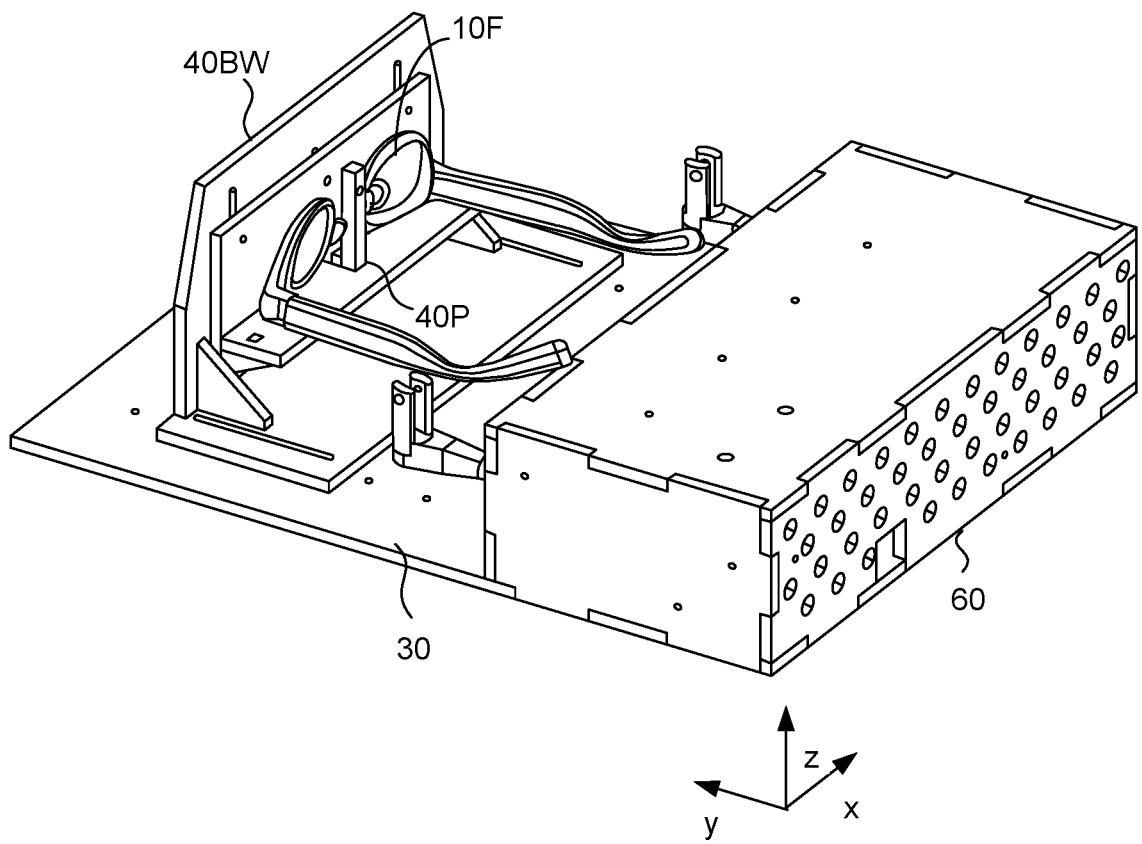

FIGS. 4A and 4B illustrate additional perspective views of the motorized endurance tester 200 of FIGS. 2A, 2B and 3. As shown in FIGS. 4A and 4B, front frame portion (e.g., frame 10F) of glasses 100 is secured on shelf 40S of the adjustable frame holder (e.g. stand 40) by a post (e.g., post 40P) which may be screwed to backwall 40BW.

In example implementations, a programable controller circuit may be used to control operation of motorized endurance tester 200. FIG. 3 shows, for example, a controller circuit 70 (including, for example, a microprocessor 72) linked to control operation of motor 50M. Controller circuit 70 may include switches (e.g., switch 74) to turn on or off, or pause motorized endurance tester 200 during an endurance test, a settable switch (e.g., a speed controller 76) to set a cycle speed or rate for displacing the temples during the endurance test, and another settable switch (e.g. a displacement range controller 78) to set a displacement range (distance) for displacing the temples through different inter-temple distances D during the endurance test.

In example implementations, motorized endurance tester 200 may be configured to have a maximum displacement range of up to about 85 mm for each temple, and a cycle speed or rate of up to 100 cycles per minute.

In an example endurance test, the temples of the glasses may be displaced through pre-determined distances (e.g., 40 mm displacement for each temple) at a pre-determined cycle rate (e.g., 47 cycles/minute at 40 mm displacement) according to an example schedule of the test.

Motorized endurance tester 200 may be constructed using materials including metals and plastics. The components may include 3D printed components and off-the shelf components. For example, motorized endurance tester 200 may be assembled using acrylic material for walls/top/bottom, aluminum rails, plastic gears, bearings, 3D printed arms and supports, an off-the-shelf microprocessor (e.g., Arduino nano), an off-the-shelf stepper motor (e.g., NEMA 17 High Torque Stepper Motor), and an off-the-shelf motor controller (e.g., motor controller L298N), etc.

Other implementations of motorized endurance tester 200 (e.g., motorized endurance tester 500, FIG. 5) may be based on use of a motorized linear translation stage to repeatedly push or pull the temples of the glasses under test in cycles through different inter-temple distances D. The linear translation stage may include a moving platform and stationary base joined by a bearing system. A motor (e.g., a linear motor, a stepper motor, or a DC motor, etc.) may drive a platform of the linear translation stage linearly, for example, in a y direction. The linear motion of the platform (e.g., in the y direction) may be transformed (e.g., reoriented by ninety degrees) by a scissor-like assembly of struts or linkages. The assembly of linkages may turn the linear motion of the platform through 90 degrees and move a pair of sliders in directions (e.g., the x direction and -x direction) perpendicular to the linear motion of the platform. Grippers, rods, or pillars attached to the pair of sliders may contact and move the pair of temples of the glasses in opposite directions (e.g., the x direction and -x direction) through different inter-temple distances D.

Figure 5:
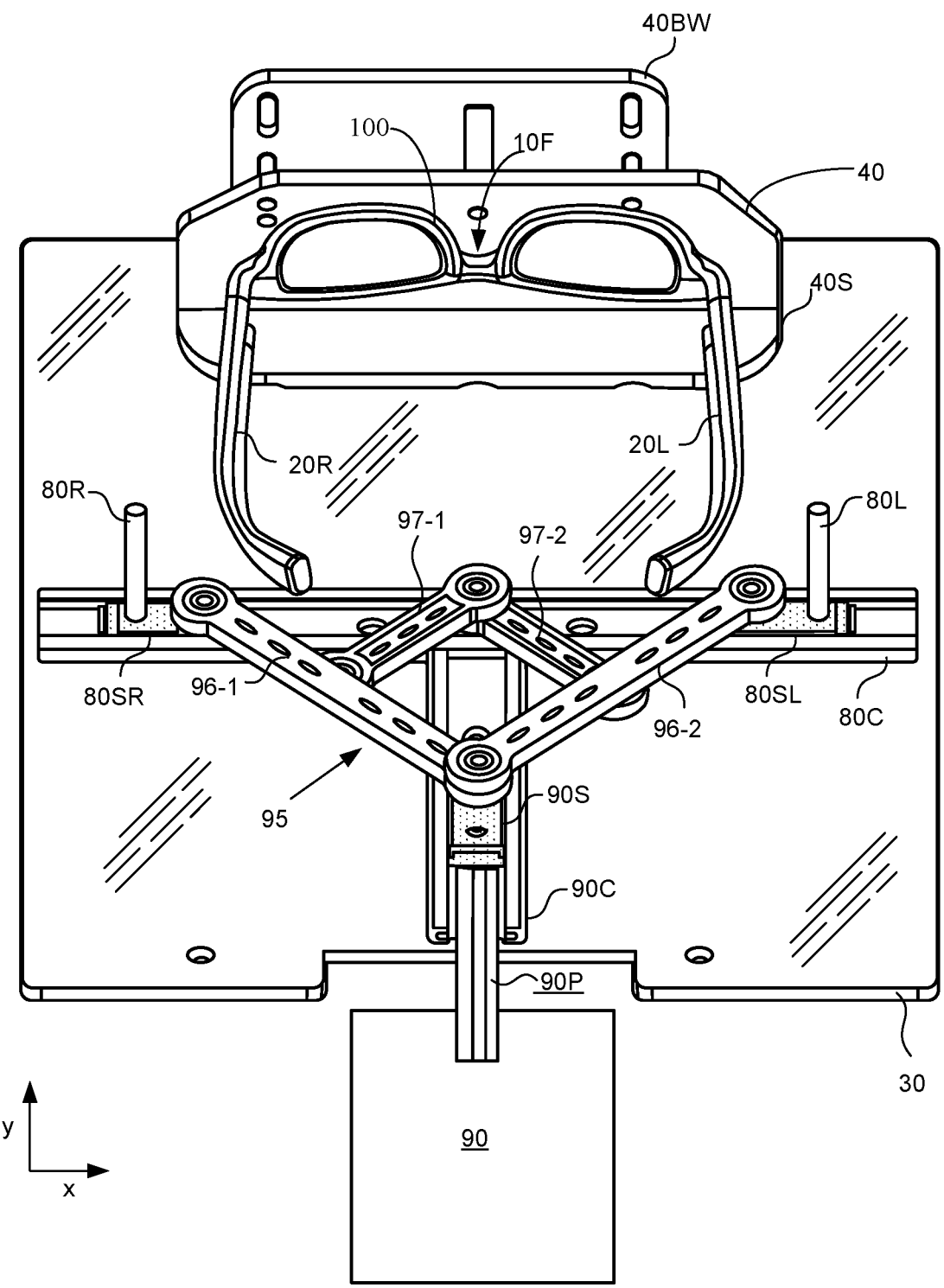
FIG. 5 illustrates portions of another motorized endurance tester of glasses.

FIG. 5 illustrates portions of an example motorized endurance tester 500 that utilizes a motorized linear stage to repeatedly push or pull the temples of the glasses under test through different inter-temple distances D.

Endurance tester 500, like endurance tester 200, may include an adjustable frame holder (e.g., stand 40) fastened on horizontal base plate 30. Adjustable frame holder (e.g., stand 40) may hold and support the eyewear (e.g., glasses 100) that are to be subject to endurance testing in a test position.

Further, endurance tester 500 may include grippers, push rods, or pillars (e.g., pillars 80R and 80L) for contacting and moving the pair of temples of the glasses through the different inter-temple distances D. Pillars 80R and 80L may be provided with acetal/plastic sleeve bearings that reduce friction and protects the contacted temples of the glasses under test. Pillars 80R and 80L may be attached to sliders (e.g., sliders 80SR and 80SL, respectively) that can slide in a track or channel 80C disposed on horizontal base plate 30. Channel 80C may be disposed (e.g., along the x direction) perpendicular to a drive channel 90C also disposed (e.g., in a y direction) on horizontal base plate 30. Drive channel 90C (e.g., an aluminum track) may include a movable slider (e.g., slider 90S) that can slide in the channel (e.g., in the y direction). In example implementations, movable slider 90S may be attached to a platform (or an extension of the platform) (e.g., platform 90P) of a motorized linear translation stage (e.g., linear stage 90).

Further, endurance tester 500 may include a foldable scissors-like mechanism 95 that couples movable slider 90S in drive channel 90C to sliders 80SR and 80SL in channel 80C, and coverts linear motion of movable slider 90S in drive channel 90C into linear motion of sliders 80SR and 80SL in opposite directions in channel 80C.

In example implementations, foldable scissors-like mechanism 95 may include a linkage (e.g., linkage 96-1) making rolling connections to slider 80SR in channel 80C and to slider 90S in drive channel 90C, a linkage (e.g., linkage 96-2) making rolling connections to slider 80SL in channel 80C and to slider 90S in drive channel 90C, and linkages 97-1 and 97-2 making rolling connections to channel 80C and to linkages 96-1 and 96-2, respectively.

Linkages 96-1 and 97-1 may form, for example, a first straight line mechanism (e.g., a first Scott Russell-type linkage) for a right-angle change of motion, linear-to-linear. Linkages 96-2 and 97-2 may form, for example, a second straight line mechanism (e.g., a second Scott Russell-type linkage) for a right-angle change of motion, linear-to-linear.

In example implementations, when slider 90S attached to platform 90P of motorized linear stage 90 moves linearly (i.e., up in the y direction as shown in FIG. 5) in drive channel 90C toward stand 40, linkages 96-1 and 97-1 cause slider 80SR and attached pillar 80R to move linearly in the −x direction in channel 80C, and linkages 96-2 and 97-2 cause slider 80SL and attached pillar 80L to move linearly in the x direction in channel 80C. When platform 90P and slider 90S of the motorized linear stage moves linearly (i.e., down in the y direction as shown in FIG. 5) in drive channel 90C away from stand 40, the directions of movement of the sliders in channel 80C are reversed (i.e., linkages 96-1 and 97-1 cause slider 80SR and attached pillar 80R to move linearly in the x direction in channel 80C, and linkages 96-2 and 97-2 cause slider 80SL and attached pillar 80L to move linearly in the −x direction in channel 80C).

For endurance testing of the glasses, the temples of the glasses under test may be positioned to be in contact with pillars 80R and 80L. Pillars 80R and 80L may be provided with acetal/plastic sleeve bearings that reduce friction and protects the temples of the glasses under test. Motorized linear stage 90 may be programmed so that platform 90P (and attached slider 90S) of the motorized linear stage cyclically moves back and forth in the y direction (e.g., between a distance d1 (FIG. 6) and distance d2 (FIG. 7)) causing sliders 80SR and 80SL (and the attached pillars 80R and 80L) to cyclically move back and forth in opposite directions (e.g., in the x and the −x direction, or the −x direction and the x direction, respectively) in channel 80C. The temples of the glasses under test may be placed in contact with, and displaced (stretched) in cycles by, the cyclically moving pillars.

Figure 6:
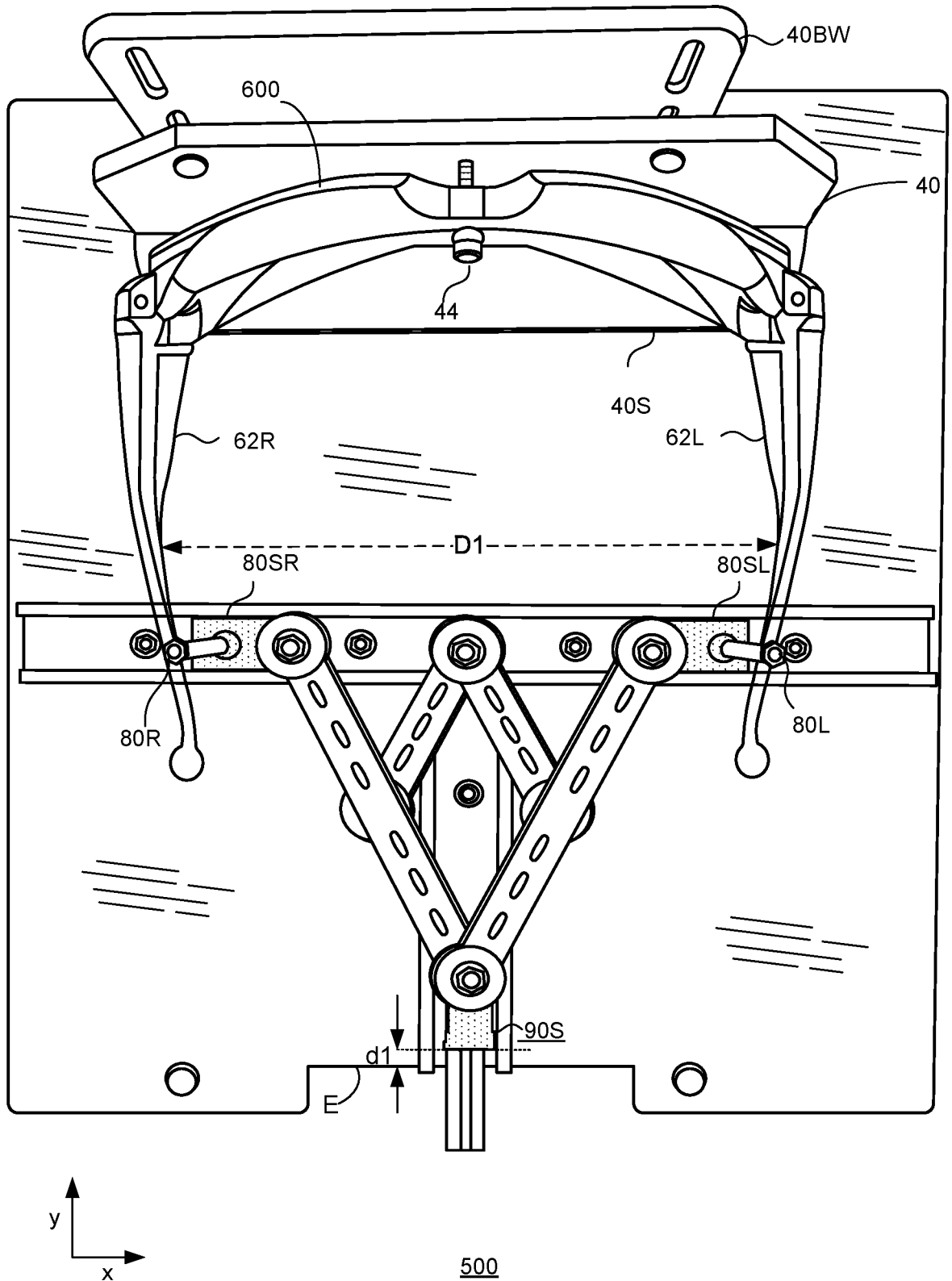
FIGS. 6 and 7 illustrate an example pair of glasses undergoing an endurance test in the motorized endurance tester of FIG. 5.
Figure 7:
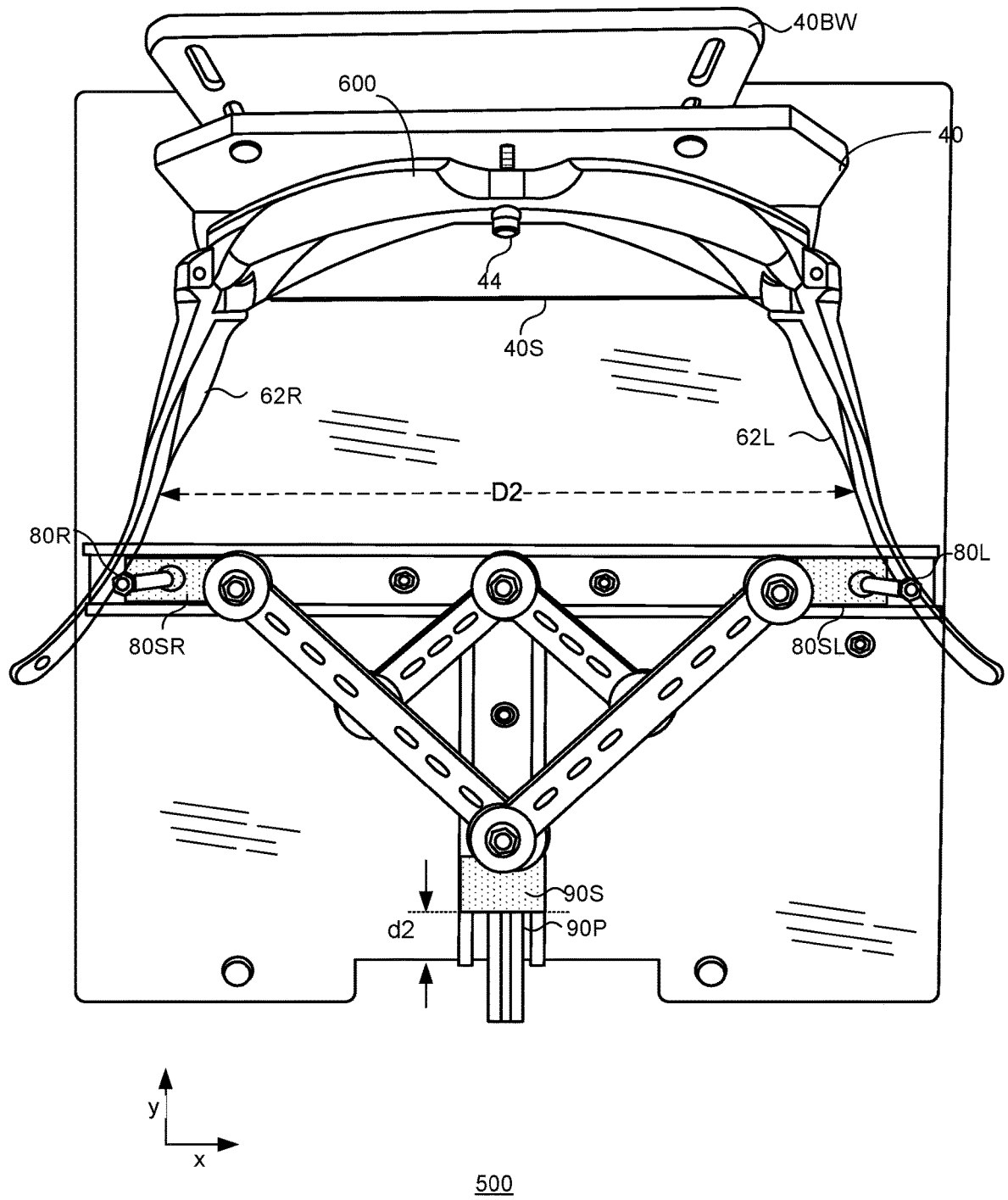

FIGS. 6 and 7 illustrate an example pair of glasses (e.g., glasses 600) undergoing an endurance test in endurance tester 500.

Glasses 600 may include a right temple 62R and a left temple 62L whose endurance is to be tested in endurance tester 500. As shown in the figures, glasses 600 may be fastened to the adjustable frame holder (e.g., stand 40) by a screw 44, and have right temple 62R and left temple 62L extend from shelf 40S toward channel 80C (in the space above base plate 30). Stand 40 may be adjustable, for example, in the y and z directions, to place glasses 600 in a test position above base plate 30 in motorized endurance tester 500. In the test position, right temple 62R and left temple 62L may be positioned outside of pillars 80R and 80L so that they can be contacted by, and stretched (pushed) outwardly (e.g., in the −x direction and the x direction, respectively) by pillars 80R and 80L moving in channel 80C.

FIG. 6 depicts a position of right temple 62R and left temple 62L, for example, at a beginning of a stretching cycle of the endurance test. As shown in the figure, at the beginning of the stretching cycle, slider 90S (attached to the platform 90P of linear stage 90, FIG. 5) may be at a distance d1 (from an edge E of base plate 30), and right temple 62R and left temple 62L (positioned outside of pillars 80R and 80L, respectively) may have an inter-temple distance of D1.

FIG. 7 depicts a position of right temple 62R and left temple 62L, for example, at the end of the stretching cycle of the endurance test. As shown in the figure, at the end of the stretching cycle, slider 90S (attached to the platform 90P of the linear stage 90, FIG. 5) may be at a distance d2 (from the edge E of base plate 30) that is greater than the distance d1 (FIG. 6) at the beginning of the stretching cycle. Further, right temple 62R and left temple 62L (positioned outside of pillars 80R and 80L, respectively) may have an inter-temple distance of D2 that is greater than inter-temple distance of D1 (FIG. 6) at the beginning of the stretching cycle.

The endurance test may include a pre-determined number of stretching cycles (e.g., a few or several thousands of cycles). After the pre-determined number of stretching cycles, glasses 600 may be removed from endurance tester 500 and inspected for structural and dimensional integrity (e.g., using electrical or optical inspection or measurement tools (not shown)).

In example implementations, motorized endurance tester 500, like motorized endurance tester 200, may be constructed using materials including metals and plastics. The components used to construct motorized endurance tester 500 may include, for example, 3D printed components and off-the shelf components. For example, motorized endurance tester 500 may be assembled using an off-the-shelf heavy duty linear translation stage with an integrated linear encoder and controller (e.g., a Zaber linear stage Model No. X-LRQ300BP-DE51). The linkages, sliders, and bearings used in the foldable scissors-like mechanism 95 (used for the right-angle change of motions, linear-to-linear), may be 3D printed plastic components. In example implementations, the 3D printed parts may be made from Vero White resin or any other plastic material or resin. Aluminum rails and low profile sleeve carriages may be used to establish direction of motion of the sliders. For 4 mm shaft diameter, lightweight bearings plastic ball bearings (from McMaster) may provide a smooth motion transitions.

In example implementations, wear-resistant dry-running sleeve bearings (e.g., Acetal sleeve bearings from McMaster) may be used on pillars 80R and 80L to protect the frames and eliminate friction between pillars 80R and 80L and the temples that are contacted and displaced by the pillars.

Motorized endurance tester 500 may be programmable (e.g., in Python code) to set endurance test parameters such as speed, acceleration, dwell time at each cycle, displacement, and cycle count.

FIG. 8 illustrates an example method 800 for endurance testing of eyewear. The disclosed method may be used for testing any all types of eyewear, including prescription glasses, reading spectacles, fashion eyewear, sunglasses, ski and safety goggles, Augmented Reality (AR) or Virtual Reality (VR) glasses, smart glasses, etc.

In example implementations, the eyewear being tested may be a pair of glasses. The pair of glasses may include a front frame for holding lenses in front of a person's eyes, typically utilizing a nose bridge over the nose. The pair of glasses may also include a pair of legs (known as temples or temple pieces), which rest over the person's ears, attached to and extending from the front frame. The pair of temples (e.g., a right temple and a left temple) may have a default or freestanding horizontal inter-temple separation D, for example, in a direction parallel to the front frame. In use, the person may repeatedly put on or take off the pair of glasses from his or her face—actions which can involve bending or stretching the pair of temples compressing or expanding the inter-temple separation D (e.g., between the right temple and the left temple) in the direction parallel to the front frame.

The endurance testing method involves simulating actions of the person putting on and taking off the eyewear from his or her face repeatedly over a period of time.

Method 800 may be implemented using, for example, an endurance tester device (e.g., endurance tester 200, or endurance tester 500) in a laboratory environment.

Method 800 may include fastening the pair of glasses to a vertical stand disposed on a horizontal base plate with the pair of temples of the pair of glasses extending horizontally from the stand at a height in a space above the horizontal base plate (810).

Method 800 may further include using a pair of motorized pushers to repeatedly displace (stretch) each of the pair of temples simultaneously toward or away from the other temple in the pair (820). Stretching each of the pair of temples simultaneously toward or away from the other temple in the pair may result in compressing or expanding the inter-temple separation D between the temples in a direction parallel to the front frame.

Method 800 may further include, after a pre-determined number of displacement (stretching) cycles using the pair of motorized pushers to repeatedly displace (stretch) each of the pair of temples and inspecting the pair of glasses including the pair of temples for structural or functional degradation.

In instances where the pair of glasses are smart glasses and the temples enclose or are attached to electrical or optical components, the inspection may include inspection of these enclosed or attached electrical or optical components to determine their structural or functional integrity.

In example implementations, a pre-determined number of displacement (stretching) cycles before inspection may be greater than several thousand cycles (e.g., in a range of about 1,000 cycles to about 1,000,000 cycles). In example implementations, a pre-determined number of displacement (stretching) cycles during an endurance test may be in a range of about 1000 to 1,000,000 cycles (e.g., 15,000 cycles) with inspections after every few thousand cycles (e.g., after every 1,000 to 4,000 cycles).

In some example implementations, using the pair of motorized pushers 820 may include using a pair of pushers powered by a stepper motor via a dual track and pinion mechanism, the dual track and pinion mechanism being arranged to move each of the pair of pushers in opposite directions.

In some other example implementations, using the pair of motorized pushers 820 may include using a pair of pushers coupled to a motorized linear translation stage via an arrangement of linkages, the arrangement of linkages being arranged to move each of the pair of pushers in opposite directions at ninety degrees to a linear motion of a platform of the motorized linear translation stage.

While example embodiments may include various modifications and alternative forms, embodiments thereof are shown by way of example in the drawings and description herein. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

For example, in some implementations, the endurance testers described herein (e.g., endurance tester 200 or endurance tester 500) may be scaled in size to accommodate simultaneous testing of two or more glasses as a batch under identical conditions. For example, stand 40 (FIG. 2A, 2B) may be scaled in size (e.g., height) to have two shelves (e.g., shelf 40S), one on top of the other, on which two glasses can be positioned for batch testing in an endurance tester.

Figure 9B:
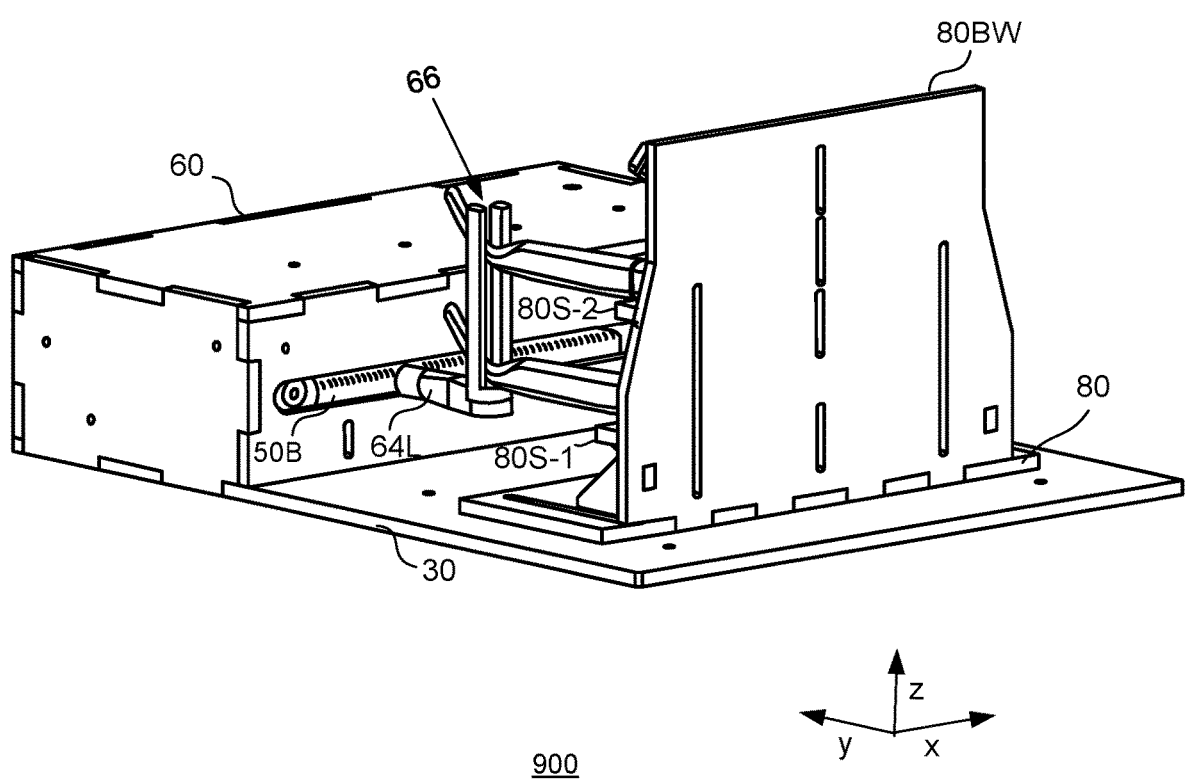
Figure 9C:
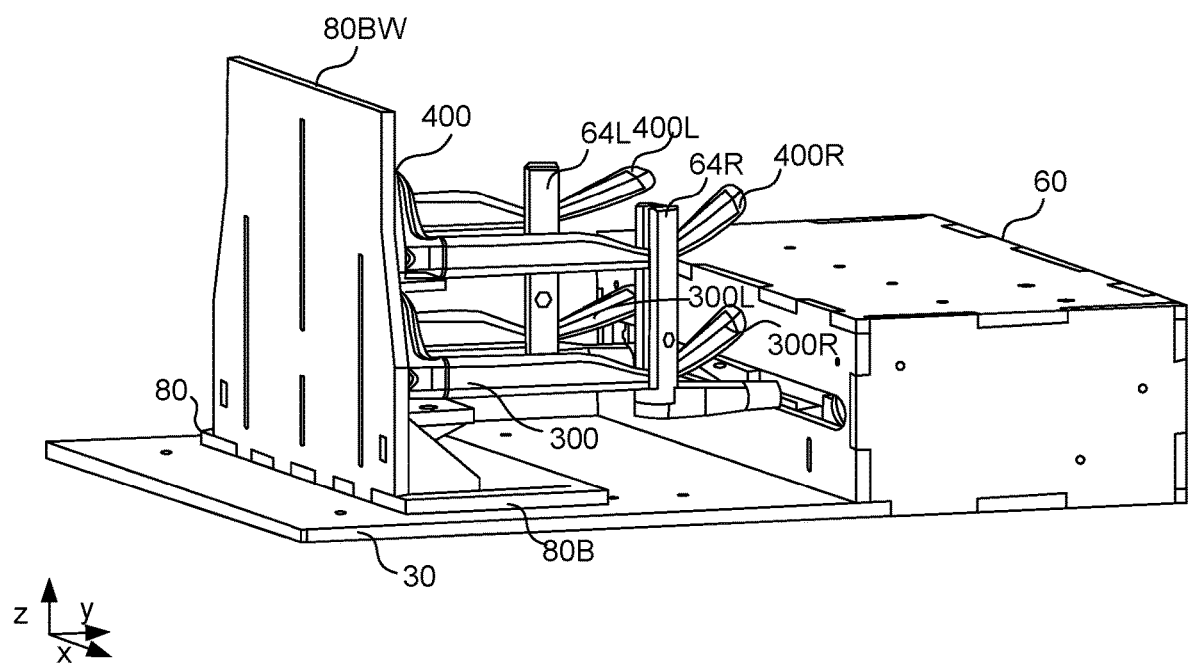

FIGS. 9A-9C illustrate views of a motorized endurance tester (e.g., tester 900) which is a scaled-up version of motorized endurance tester 200 (of FIGS. 2A and 2B).

Tester 900 may be configured to test multiple pairs of glasses (e.g., two pairs—glasses 300 and glasses 400) simultaneously. Tester 900 may include an adjustable frame holder (e.g., stand 80) disposed on horizontal base plate 30. Stand 80 may be configured secure the test eyewear (e.g., glasses 300 and 400), one above the other, in a test position in the tester.

Stand 80 may include a backwall 80BW extending vertically from stand base 80B, and one or more shelves (e.g., shelfs 80S-1 and 80S-2) extending horizontally (e.g., in the y direction) from backwall 80BW. As shown in the figures, in test position, a front portion of glasses 300 may be placed on, and supported by, shelf 80S-1, while the right and left temples (e.g., temples 300R and 300L) of the glasses may extend beyond shelf 80S-1 (e.g., in the y direction in a space above base plate 30). The right and left temples of glasses 300 may, for example, extend (e.g., in the y direction) beyond shelf 80S-1 at a height H1 above base plate 30. Further, in test position, a front portion of glasses 400 may be placed on, and supported by, shelf 80S-2 (above shelf 80S-1), while the right and left temples (e.g., temples 400R and 400L) of the glasses may extend beyond shelf 80S-2 (e.g., in the y direction in a space above base plate 30). The right and left temples of glasses 400 may, for example, extend (e.g., in the y direction) beyond shelf 80S-2 at a height H2 (H2>H1) above base plate 30. Glasses 300 and glasses 400 may be secured to backwall 80BW in test position by one or more screws or posts (e.g., posts 80P).

Tester 900 (like tester 200 or like tester 500) may include moveable grippers or pushers (e.g., pusher 64R and pusher 64L) that extend from motor box 60 and can be adjusted (e.g., extended or retracted in the x, y, or z directions) to contact and push the temples of the two pairs of glasses (e.g., glasses 300 and glasses 400) in the test position simultaneously. The positions of the pushers (e.g., pusher 64R and pusher 64L) may be adjustable, for example, to align with (or grip) the temples of the two pairs of glasses (e.g., glasses 300 and glasses 400) at the same time. The position of pusher 64R may, for example, be adjustable to simultaneously grip the right temples (e.g., temples 300R and 400R) of the two pairs of glasses. The position of pusher 64L may, for example, be adjustable to simultaneously grip the left temples (e.g., temples 300L and 400L) of the two pairs of glasses. In some example implementations, the moveable grippers or pushers (e.g., pusher 64R and pusher 64L) may include slots (e.g., slots 66, as shown in FIGS. 9A-9C) that may be used to hold or grip the temples (e.g., right temples (300R, 400R), and left temples (e.g., right temples (300L, 400L)) (including the tips or bent portions of the temples) at any distance from the shelves.

Pushers 64R and 64L may be coupled to, and driven by, a motor (e.g., motor 60M, FIG. 3) via a coupling mechanism (e.g., gear mechanism 50, FIG. 3, or foldable scissors-like mechanism 95, FIG. 5).

For endurance testing, pusher 64R may be driven (e.g., by motor 60M in motor box 60) to simultaneously displace (i.e., push or pull) the right temples (e.g., right temples 300R and 400R) of the glasses in a same direction (e.g., in the x or −x direction) by a same amount. Similarly, pusher 64L may be powered to simultaneously displace (i.e., push or pull) the left temples (e.g., left temples 300L and 400L) of the glasses in a same direction (e.g., in the x or −x direction) by a same amount. In each cycle, the right temples and the left temples may be displaced in opposite directions.

For endurance testing, pusher 64R and pusher 64L may repeatedly displace (i.e., push or pull) the right temples and the left temples of both the glasses 300 and 400 in cycles in opposite directions through different inter-temple distances D. For this purpose, pusher 60R and pusher 60L may be coupled to, and driven by, a motor in motor box 60 to move in opposite directions along the x direction.

Individually testing the two glasses in different testers (or serially testing at different times in the same tester) may not exactly replicate the testing conditions. The joint or simultaneous testing (i.e., under identical or simultaneous displacement (stretching) cycles) of the glasses (e.g., glasses 300 and 400) in tester 900 may result in a better comparison of the endurance performance of the two glasses than can be obtained by testing the two glasses separately or serially.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations can be performed in parallel, concurrently, or simultaneously. In addition, the order of operations can be re-arranged. The processes can be terminated when their operations are completed but may also have additional steps not included in the figure. The processes may correspond to methods, functions, procedures, subroutines, subprograms, etc.

Methods discussed above, some of which are illustrated by the flow charts, can be implemented by hardware, software, firmware, middleware, microcode, hardware description languages, or any combination thereof. When implemented in software, firmware, middleware or microcode, the program code or code segments to perform the necessary tasks can be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements can be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an, and they are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

The terms "substantially," "nearly," and "about" may be used herein to describe and account for small fluctuations, such as due to variations in processing or assembly. For example, these terms can refer to less than or equal to ±5%, less than or equal to ±2%, less than or equal to ±1%, less than or equal to ±0.5%, less than or equal to ±0.2%, less than or equal to ±0.1%, or less than or equal to ±0.05%. Also, when used herein, an indefinite article "a" or "an" means "at least one."

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that can be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium can be magnetic (e.g., a floppy disk or a hard drive) or optical (e.g., a compact disk read only memory, or CD ROM), and can be read only or random access. Similarly, the transmission medium can be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A tester for endurance testing of a pair of glasses, the glasses including a frame to hold lenses in front of a pair of eyes of a person and a pair of temples which can rest over a pair of ears of the person, the tester comprising:
   a frame holder disposed vertically on a horizontal base plate, the frame holder configured to secure the pair of glasses in a test position with a first temple and a second temple of the pair of temples extending from the frame holder horizontally in a space above the horizontal base plate, the first temple and the second temple of the pair of temples having an inter-temple separation distance between each other; and
   a pair of motorized pushers configured to contact and displace the first temple and the second temple of the pair of temples simultaneously toward or away from each other.

2. The tester of claim 1, further comprising, a motor coupled to the pair of motorized pushers via a gear mechanism, wherein a first motorized pusher in the pair of motorized pushers is driven by the motor via the gear mechanism to move in an opposite direction to a movement of a second motorized pusher in the pair of motorized pushers.

3. The tester of claim 2, wherein the gear mechanism includes a dual track and pinion mechanism arranged to move the first motorized pusher and the second motorized pusher in the opposite direction.

4. The tester of claim 3, wherein each track of the dual track and pinion mechanism is coupled to a respective wheel running on a common linear rail, and wherein an axle of the respective wheel is attached to a respective one of the pair of motorized pushers.

5. The tester of claim 4, wherein a first track and a second track of dual track and pinion arrangement are arranged to translate in opposite directions in response to rotation of a pinion, and to move the respective wheel with a respective one of the pair of motorized pushers in the opposite directions.

6. The tester of claim 1, further comprising, a motorized linear stage coupled to the pair of motorized pushers via an assembly of linkages, the assembly of linkages turning a linear motion of a platform of the motorized linear stage through 90 degrees.

7. The tester of claim 6, wherein the assembly of linkages includes pairs of linkages moving the pair of motorized pushers in opposite directions at 90 degrees to the linear motion of the platform of the motorized linear stage.

8. The tester of claim 1, further comprising a programable controller circuit to control operation of a motor driving the pair of motorized pushers.

9. The tester of claim 8, further including:
   switches to turn on or off, or pause the tester during an endurance test;
   a settable switch to set a cycle speed or rate for cyclically displacing the temples during the endurance test; and
   a settable switch to set a displacement range for the inter-temple separation distance during the endurance test.

10. The tester of claim 9 further configured to have a maximum displacement range of up to about 85 mm for each temple, and a displacement cycle speed or rate of up to 100 cycles per minute.

11. The tester of claim 1, wherein the frame holder includes a stand base disposed on the horizontal base plate, a backwall extending vertically from the stand base and a shelf extending horizontally from the backwall, the shelf being adapted to support a front portion of the pair of glasses in the test position with the pair of temples extending from the shelf horizontally in the space above the horizontal base plate.

12. The tester of claim 11, wherein a post is disposed on the shelf to secure the front portion of the pair of glasses on the shelf.

13. The tester of claim 11, wherein a height of the shelf above the horizontal base plate and a position of the stand base on the horizontal base plate are adjustable to accommodate glasses of varied sizes in the tester.

14. The tester of claim 1, wherein each of the pair of motorized pushers include a slot to hold or grip a respective temple.

15. A method for endurance testing of a pair of glasses, the method comprising:
   fastening a pair of glasses to a vertical stand disposed on a horizontal base plate with a pair of temples of the pair of glasses extending horizontally from the vertical stand at a height in a space above the horizontal base plate;

using a pair of motorized pushers to repeatedly displace a first temple and a second temple of the pair of temples simultaneously toward or away from each other; and after a pre-determined number of displacement cycles using the pair of motorized pushers to repeatedly displace each of the pair of temples, inspecting the pair of glasses including the pair of temples for structural or functional degradation.

16. The method of claim 15, wherein using the pair of motorized includes using a pair of pushers powered by a stepper motor via a dual track and pinion mechanism, the dual track and pinion mechanism being arranged to move each of the pair of pushers in opposite directions.

17. The method of claim 15, wherein using the pair of motorized pushers includes using a pair of pushers coupled a motorized linear stage via an arrangement of linkages, the arrangement of linkages being arranged to move each of the pair of pushers in opposite directions at ninety degrees to a linear motion of a platform of the motorized linear stage.

18. The method of claim 15, wherein the pre-determined number of displacement cycles before inspection is in a range of about 10,000 cycles to about 1,000,000 cycles.

19. The method of claim 15, wherein in an endurance test, each of the pair of temples is displaced through a pre-determined distance at a pre-determined cycle rate according to a schedule of the endurance test.

20. The method of claim 15, wherein the pair of glasses are smart glasses and the temples enclose or are attached to electrical or optical components, and wherein inspecting the pair of glasses includes inspection of enclosed or attached electrical or optical components to determine their structural or functional integrity.

21. A tester for endurance testing of a first pair of glasses and a second pair of glasses, each pair of glasses including a frame to hold lenses in front of a pair of eyes of a person and a pair of temples including a left temple and a right temple which can rest over a left ear and a right ear of the person, respectively, the tester comprising:

a frame holder disposed vertically on a horizontal base plate, the frame holder configured to secure the first pair of glasses with its left and right temples extending from the frame holder horizontally at a first height above the horizontal base plate, and to secure the second pair of glasses with its left and right temples extending from the frame holder horizontally at a second height above the horizontal base plate, the second height being greater than the first height;

a first pusher configured to contact and simultaneously displace the right temple of the first pair of glasses toward or away from the left temple of the first pair of glasses and the right temple of the second pair of glasses toward or away from the left temple of the second pair of glasses; and a second pusher configured to contact and simultaneously displace the left temple of the first pair of glasses toward or away from the right temple of the first pair of glasses and the left temple of the second pair of glasses toward or away from the right temple of the second pair of glasses.

* * * * *